US009350915B2

(12) United States Patent
Wu (10) Patent No.: US 9,350,915 B2
(45) Date of Patent: May 24, 2016

(54) POWER SAVING TECHNIQUES FOR IMAGE SENSORS (71) Applicant: Semiconductor Components Industries, LLC, Phoenix, AZ (US)

(72) Inventor: Vickie Wu, Cupertino, CA (US)

(73) Assignee: SEMICONDUCTOR COMPONENTS INDUSTRIES, LLC, Phoenix, AZ (US)

( * ) Notice: Subject to any disclaimer, the term of this patent is extended or adjusted under 35 U.S.C. 154(b) by 0 days.

(21) Appl. No.: 13/778,859

(22) Filed: Feb. 27, 2013

(65) Prior Publication Data
US 2013/0235239 A1    Sep. 12, 2013

Related U.S. Application Data (60) Provisional application No. 61/604,453, filed on Feb. 28, 2012.

(51) Int. Cl.
*H04N 5/232* (2006.01)
*H04N 5/376* (2011.01)

(52) U.S. Cl.
CPC ......... *H04N 5/23241* (2013.01); *H04N 5/3765* (2013.01)

(58) Field of Classification Search
CPC ............ H04N 5/23241; H04N 5/3765; G09G 2330/021
USPC .......... 348/332, 308, 302, 295, 294, 298, 312
See application file for complete search history.

(56) References Cited

U.S. PATENT DOCUMENTS

| 5,537,650 | A | * | 7/1996 | West et al. ..................... 713/324 |
|---|---|---|---|---|
| 8,248,284 | B2 | | 8/2012 | Jung et al. |
| 8,289,806 | B2 | | 10/2012 | Gomm |
| 2005/0024510 | A1 | | 2/2005 | Lapstun et al. |
| 2005/0145777 | A1 | * | 7/2005 | Barna et al. ................ 250/208.1 |
| 2005/0243190 | A1 | * | 11/2005 | Ogikubo .................. 348/231.99 |
| 2006/0197857 | A1 | * | 9/2006 | Barna et al. ................... 348/308 |

* cited by examiner

*Primary Examiner* — Ahmed A Berhan
(74) *Attorney, Agent, or Firm* — Treyz Law Group; Vineet Dixit (57) ABSTRACT

Power saving techniques are provided for processing circuitry on image sensors. Processing circuitry may include one or more processing blocks. The processing blocks may receive pixel data in the form of lines separated by blanking time. To reduce power consumption, each processing block may have a clock that is enabled when processing data and disabled during blanking time. The processing blocks may have respective clocks that are enabled and disabled at different times. Timing control circuitry may provide a clock enable signal to a first processing block. Each processing block may receive a clock enable signal and output a time-shifted clock enable signal for a subsequent processing block.

18 Claims, 6 Drawing Sheets

POWER SAVING TECHNIQUES FOR IMAGE SENSORS

This application claims the benefit of provisional patent application No. 61/604,453, filed Feb. 28, 2012, which is hereby incorporated by reference herein in its entirety.

BACKGROUND

This relates generally to imaging devices, and more particularly, to power saving techniques for processing circuitry on imaging devices.

Image sensors are commonly used in electronic devices such as cellular telephones, cameras, and computers to capture images. Conventional image sensors are fabricated on a semiconductor substrate using complementary metal-oxide-semiconductor (CMOS) technology or charge-coupled device (CCD) technology.

An image sensor may include a pixel array having photodiodes. Pixels signals from the pixel array may be sampled and processed by control and processing circuitry. Control and processing circuitry may include an analog core and a digital core.

It may be desirable to have image sensors with digital cores that consume less power.

DETAILED DESCRIPTION

Digital camera modules are widely used in electronic devices such as digital cameras, computers, cellular telephones, or other electronic devices. These electronic devices may include image sensors that receive incoming light to capture an image. The image sensors may include arrays of image sensor pixels. The pixels in the image sensors may include photosensitive elements such as photodiodes that convert the incoming light into digital data. Image sensors may have any number of pixels (e.g., hundreds or thousands or more). A typical image sensor may, for example, have millions of pixels (e.g., megapixels). Image sensors with ten megapixels or more are not uncommon.

Image sensors may have processing circuitry that includes a digital core. A digital core may have one or more blocks that perform specific image processing functions. Pixel data may be processed sequentially through the blocks in the digital core. Pixel data may be received at the blocks line-by-line and frame-by-frame. The time between lines and frames of data may be known as blanking time. The time between lines of data may be known as horizontal blanking time. The time in between frames of data may be known as vertical blanking time.

During blanking time, digital core processing blocks are not processing data. Since no data is being processed, logic in the processing blocks is not toggling during blanking time. However, processing blocks may have clock trees with thousands of clock buffers that continue to toggle at high frequency. Having enabled clocks during blanking time causes unnecessary power to be consumed. Gates and memory in the blocks will also consume a certain amount of power during blanking time, although much less as compared to during non-blanking time (i.e., when pixel data is being processed).

Power saving techniques may be implemented such that clocks for individual blocks in the digital core are enabled only when the individual blocks are processing data. When a block is not processing data (i.e. during blanking time for pixel data arriving at that block), a clock for that block may be disabled. Since data that received and processed sequentially through the blocks, clocks may be enabled and disabled for each block sequentially. Each individual block in the digital core may have a clock that is turned on and off dynamically.

Figure 1:
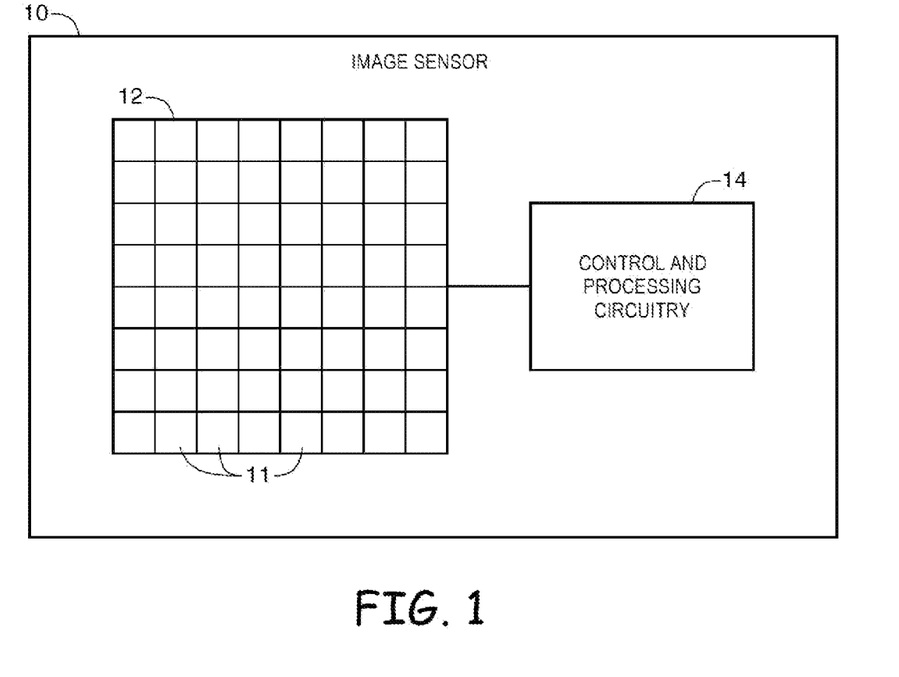
FIG. 1 is a diagram of an illustrative imaging sensor in accordance with an embodiment of the present invention.

An illustrative imaging device 10 is shown in FIG. 1. Imaging device 10 may have a pixel array such as pixel array 12. Pixel array 12 may have hundreds, thousands, millions, or more pixels 11 arranged in rows and columns. Each pixel 11 may have a light-sensitive element such as photodiode. Charge may collect pixels 11 when pixels 11 are exposed to light during an integration period. If desired, an entire pixel array 12 may be exposed to light at once using a global shutter. Alternatively, a pixel array 12 may be exposed to light row by row using a rolling shutter.

Imaging device 10 may have control and processing circuitry 14. Addressing and control signals may be provided to pixels 11 to control pixels 11 through reset, integration, and sampling periods. Pixels 11 may be reset to a reset voltage to prepare pixels 11 for the next integration period. The reset voltage may be sampled from pixels 11. Pixel array 12 may be exposed to light in a subsequent integration period, causing charge to collect in pixels 11. Charge may be sampled from each pixel 11 as an analog pixel voltage. Circuitry 14 may perform analog-to-digital conversion of pixel signals. Circuitry 14 may also perform image processing such as defect identification and masking, scaling, compression, and other suitable image processing.

Figure 2:
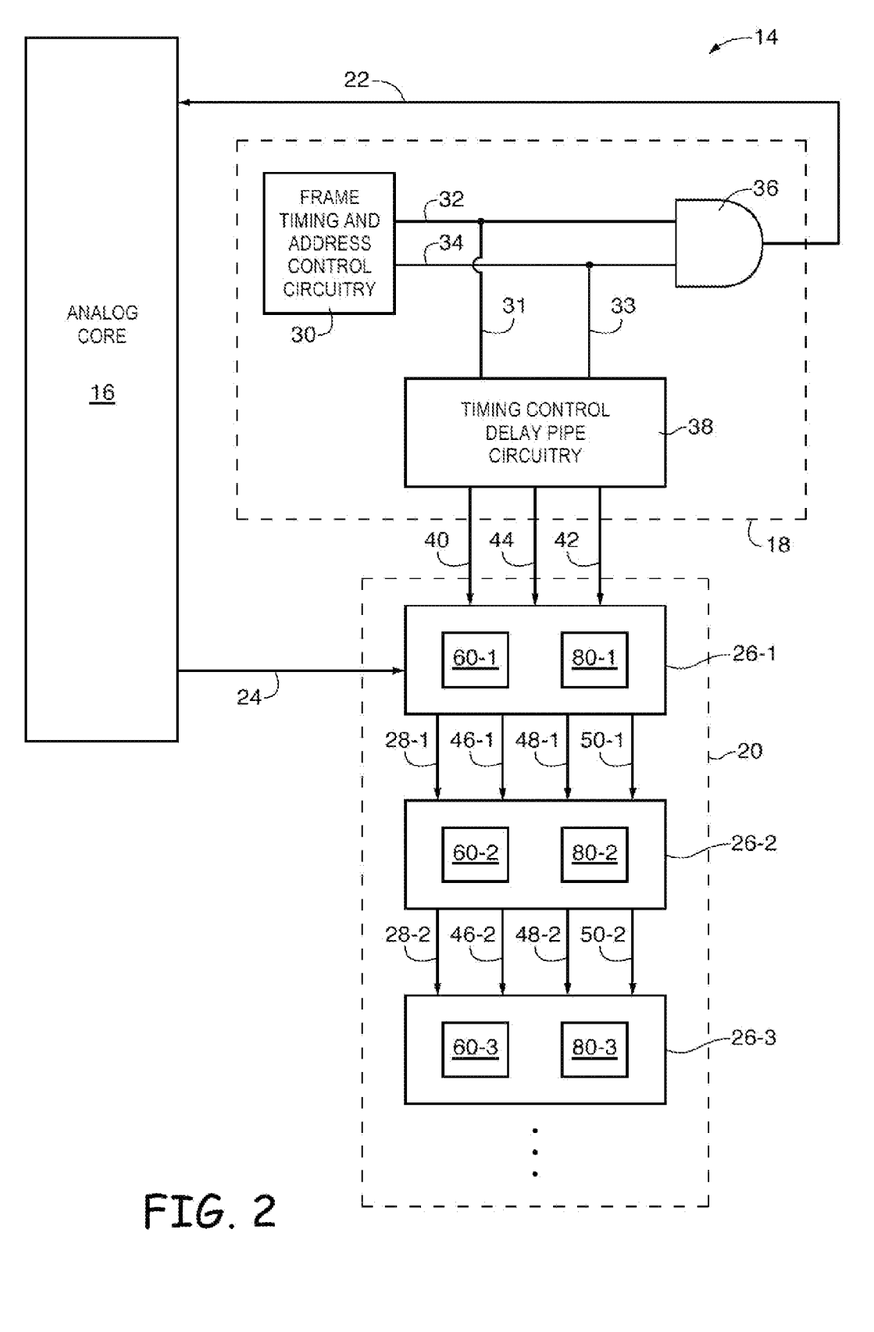
FIG. 2 is a diagram of illustrative control and processing circuitry in accordance with an embodiment of the present invention.

A diagram of illustrative control and processing circuitry 14 is shown in FIG. 2. Control and processing circuitry 14 may have an analog core 16, a timing control block 18, and a digital core 20.

Analog core 16 may sample analog pixels signals from pixel array and perform analog-to-digital conversion on the pixel signals. Analog core 16 may output pixel signals, also known as pixel data, or data signals, to digital core 20 on a path such as path 24. Analog core 16 may perform some image processing operations. If desired, analog core 16 may perform compression and gain processing on pixel signals.

Digital core 20 may have one or more processing blocks 26 (e.g., blocks 26-1, 26-2 . . . ). Pixel data may be processed sequentially by processing blocks 26. A first processing block 26-1 may receive data signals from analog core 16 on path 24. After the first processing block 26-1 has finished processing the data signals, processing block 26-1 may output the processed data to a second processing block such as processing block 26-2. The second processing block 26-2 may then perform its processing operations on the pixel data and output the data to a subsequent processing block. Each processing block 26 may take a different number of clock cycles to perform its processing operations. Each processing block 26 may have timing control circuitry 60 (e.g., timing control circuitry 60-1, 60-2, 60-3 . . . ). Each processing block 26 may have processing circuitry (e.g., processing circuitry 80-1, 80-2, 80-3 . . . ).

There may be any suitable number of processing blocks. There may be, e.g., two, three, four, five, or more than five processing blocks in digital core 20. Processing blocks 26 may each perform a specific function. For example, a first processing block 26-1 may include circuitry for defect identification and masking. A second processing block 26-2 may include circuitry for scaling operations. A third processing block 26-3 may include circuitry for performing compression. This is merely an illustrative arrangement for processing blocks 26. If desired, other arrangements for processing blocks 26 may be provided.

Timing control block 18 may provide timing and controls signals to analog core 16 and digital core 20. Timing control block 18 may have frame timing and address control circuitry 30. Circuitry 30 may output a frame valid signal Frame_valid on path 32. Circuitry 30 may output a line valid signal Line_valid signal on path 34. Timing control block 18 may have a logic gate such as AND gate 36. AND gate 36 may receive as inputs the signal Frame_valid on path 32 and the signal Line_valid on path 34. AND gate 36 may output an enable signal on path 22 that is high only when both signal Frame_valid signal Line_valid are high. The enable signal on path 22 may be provided to analog core 16.

Figure 5:
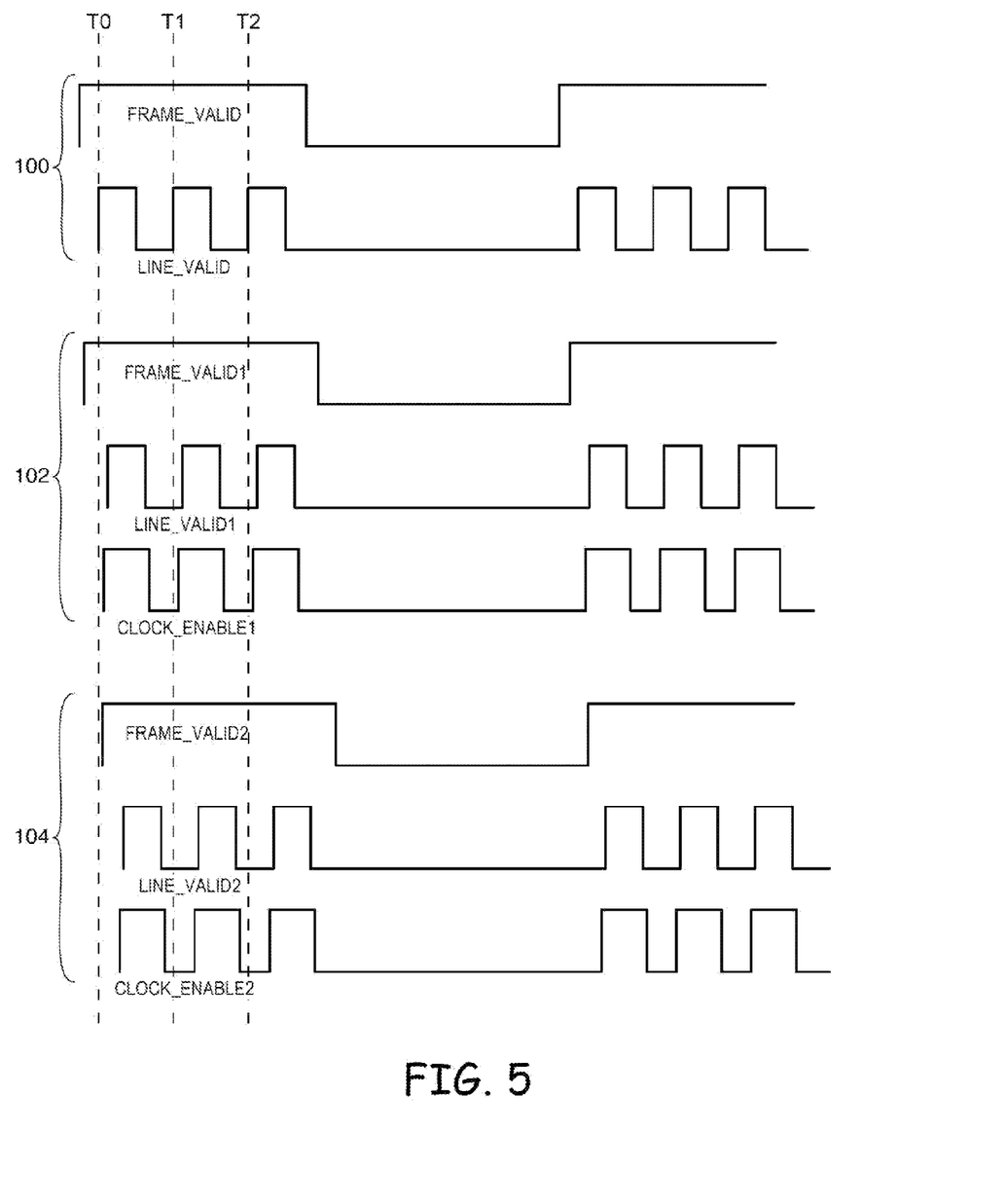
FIG. 5 is a diagram of an illustrative timing diagram for the timing control circuitry of FIGS. 2-4 in accordance with an embodiment of the present invention.

Frame valid and line valid signals are shown in section 100 of an illustrative timing diagram of FIG. 5. A line valid signal Line_valid may be high when a line is being addressed or processed, and low during horizontal blanking time between frames. A frame valid signal may be high when a frame is being addressed or processed, and low during vertical blanking time between frames.

It may be desirable to provide timing control signals to digital core 20 that are delayed with respect to those provided to analog circuitry 16. This may account for pixel data being processed first at analog core 16 and later at digital core 20. Timing control block 18 may have timing control delay pipe circuitry 38. Timing control delay pipe circuitry 38 may add a delay signal Frame_valid and signal Line_valid signals received on paths 31 and 32, respectively, from circuitry 30. Timing control delay pipe circuitry 38 may output delayed frame valid and line valid signals to a first processing block 26 in digital core 20. Timing control delay pipe circuitry 38 may output a delayed frame valid signal on a path such as path 40, a delayed line valid signal on a path such as path 42, and a clock enable signal on a path such as path 44.

The first processing block 26-1 may receive frame valid, line valid, and clock enable signals from timing control delay pipe 38. Block 26-1 may use the provided clock enable signal to determine when to enable and disable its clock. A clock in block 26-1 may be enabled while data is being received (e.g., on path 24) and processed, and disabled during vertical and horizontal blanking time between lines of data. A clock in block 26-1 may be enabled a few clock cycles before a line of pixel data is received on path 24. For example, a clock in block 26-1 may be enabled two cycles, three cycles, 1-3 cycles, or another suitable number of cycles before a line of pixel data is received on path 24. A clock in block 26-1 may be disabled after it has finished processing a line of data.

Processing block 26-1 may have circuitry that adds additional delay to frame valid, line valid, and clock enable signals before outputting these signals to a second processing block 26-2. The additional delay may account for the processing time of processing block 26-1, and any path delays. Each block 26 may add a customized delay to a clock enable signal in order to provide an appropriate clock enable signal to a subsequent block 26.

Each block 26 may receive a frame valid signal that is high when a frame of data is being received at the block and low during blanking time between frames. Each block may receive a line valid signal that is high when a line of data is being received at the block and low during blanking time between lines. The received clock enable signal may differ from the line valid signal in that the clock enable signal becomes high a few cycles before the line valid signal, and is high for a longer time to account for the processing time of that block.

For simplicity, the diagram of FIG. 2 focuses on the portions of control and processing circuitry 14 that are directly relevant to the power saving techniques of the current invention. Control and processing circuitry 14 may have other circuitry and paths other than the circuitry and paths shown in the example of FIG. 2. Digital core 20 may control the timing of the integration, reset, and sampling of pixel array 12. Timing control block 18 may generate signals for the integration, reset, and sampling of pixel array 12. There may be additional paths between timing control block 18, analog core 16, and digital core 20.

Figure 3:
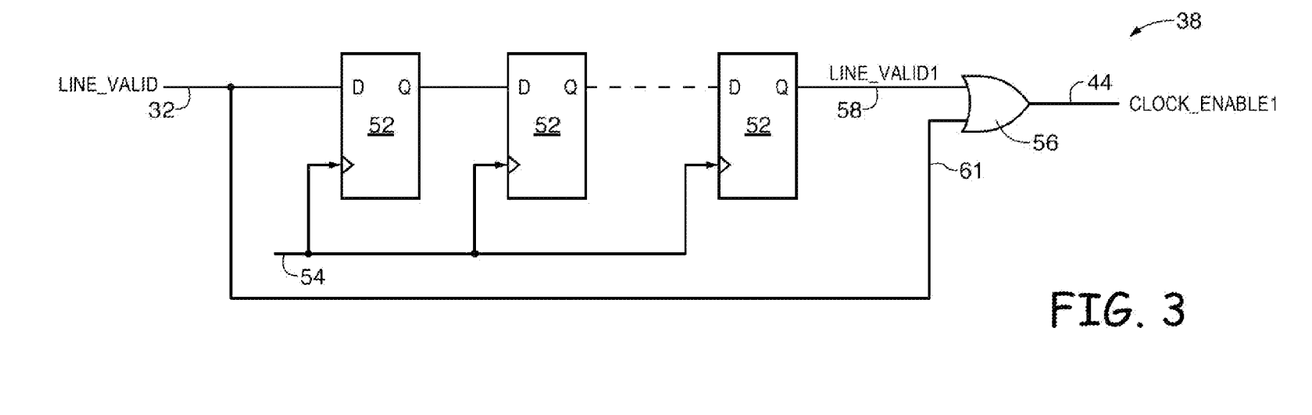
FIG. 3 is a diagram of illustrative timing control delay pipe circuitry in accordance with an embodiment of the present invention.

Timing control block 18 of FIG. 2 may have timing control delay pipe circuitry 38 as shown in FIG. 3. Circuitry 38 may have one or more delay elements 52. Each delay element 52 may be a D flip-flop or latch. Delay elements 52 may receive a clock signal clk on path 54. Clock signal clk may be a global continuous clock. Delay elements 52 may receive a line valid signal Line_valid on path 32. Delay elements 52 may output a delayed line valid signal Line_valid1 on path 58. Circuitry 38 may have a logic gate such as OR gate 56 that receives signal Line_valid on path 61 and delayed line valid signal Line_valid1 on path 58. OR gate 56 may output clock enable signal Clock_enable1 on path 44. Line_valid1 and Clock_enable1 may be provided to a first processing block 26-1 of digital core 20 (see, e.g., FIG. 2).

Illustrative Line_valid1 and Clock_enable1 signals are shown in section 102 of an illustrative timing diagram of FIG. 5. Clock_enable1 may become high a few clock cycles before Line_valid1 so that a clock in processing block 26-1 of FIG. 2 is enabled before a line of pixel data is received at block 26-1. A frame valid signal Frame_valid1 may be delayed with respect to Frame_valid, similarly to how of Line_valid1 is delayed with respect to Line_valid.

When Line_valid and Line_valid1 signals of FIG. 5 are OR'd to produce Clock_enable1, one would expect Clock_enable1 to become high when Line_valid becomes high (e.g., at times T0, T1, T2 . . . ). However, in practice there may be path delays. Section 102 of FIG. 5 shows illustrative signals Line_valid1, Frame_valid1, and Clock_enable1 as they would be on arrival at processing block 26-1 of FIG. 2. Clock_ enable1 may become high slightly after Line_valid becomes high (e.g., slightly after times T0, T1, T2 . . . )

Figure 4:
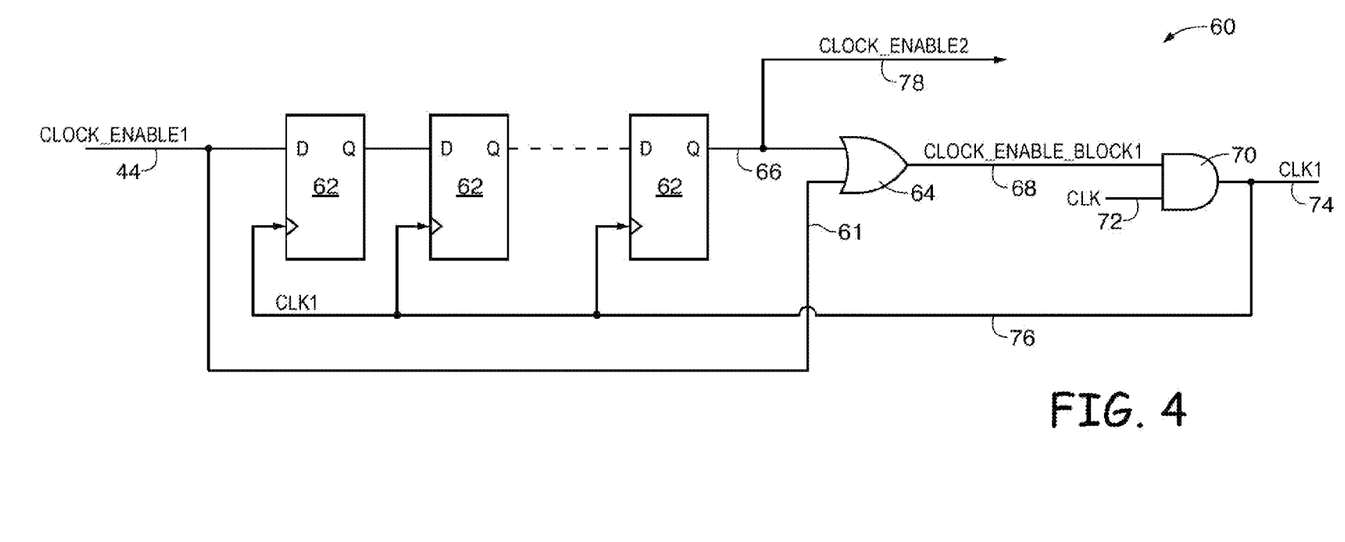
FIG. 4 is a diagram of illustrative timing control circuitry that may be included in a processing block in accordance with an embodiment of the present invention.

Processing block 26-1 of FIG. 2 may have timing control circuitry such as timing control circuit 60 of FIG. 4. Circuitry 60 may receive a clock enable signal Clock_enable1 on path 44. The clock enable signal may be passed through one or more delay elements 62. Delay elements 62 may be D flip flops or latches. Delay elements 62 may output a delayed clock signal Clock_enable2 on path 66. The delay added by delay elements 62 may represent a number of clock cycles that block 26-1 uses to process pixel data. Signal Clock_enable2 may be output to a second processing block 26-2 on a path such as path 46-1 of FIG. 2.

A logic gate such as OR gate 64 may receive Clock_Enable2 on input path 66. OR gate 64 may receive Clock_enable1 on input path 64. OR gate 64 may output a signal Clock_enable_block1 on path 68. Signal Clock_enable_block1 may become high when Clock_enable1 becomes high, and remain high until processing has finished at processing block 26-1. A logic gate such as AND gate 70 may receive Clock_enable_block1 on path 68 and a global continuous clock clk on path 72. AND gate 70 may output a clock clk1 for processing block 26-2 on path 74. Clock clk1 may be provided to processing circuitry in block 26-1 that process lines of pixel data. Clock clk1 may also be provided to delay elements 62 so that delay elements 62 are also disabled during blanking time.

Illustrative timing signals provided to processing block 26-2 are shown section 104 of FIG. 5. Clock enable signal Clock_enable2 may be provided to processing block 26-2 along with frame valid signal Frame_valid2 on line 46-1 of FIG. 2 and line valid signal Line_valid2 on line 50-1 of FIG. 2. If desired, frame valid signal Frame_valid1 and line valid signal Line_valid1 may be delayed by delay elements 62 of FIG. 4 to produce Frame_valid2 and Line_valid2.

Each processing block 26 of FIG. 2 may having timing control circuitry such as timing control circuitry 60 of FIG. 4. Each processing block 26 may receive a clock enable signal. Each processing block 26 may use logic gates produce a clock signal for that block using the clock enable signal and a global continuous block. Each processing block 26 may supply a delayed clock enable signal to a subsequent processing block on a path such as path 48 (e.g., paths 48-1, 48-2 . . . ) of FIG. 2. The amount of delay may represent the number of cycles that processing block 26 uses to process a line of data. A processing block 26 may take, for example, 30 clock cycles to process data. If desired, a processing block 26 may process data over any suitable number of clock cycles, such as 20-40 clock cycles, less than 50 clock cycles, or more than 10 clock cycles. Typically, each processing block 26 would use a different number of cycles to process data. Each processing block 26 may receive a frame valid signal and output a delayed frame valid signal on a path such as path 46 (e.g., paths 48-1, 48-2 . . . ) of FIG. 2. Each processing block 26 may receive a line valid signal and output a delayed line valid signal to a subsequent processing block on a path such as path 50 (e.g., paths 50-1, 50-2 . . . ) of FIG. 2. Each processing block 26 may receive pixel data and output pixel data to a subsequent processing block 26, on a path such as path 28 (e.g., paths 28-1, 28-2...) of FIG. 2.

Figure 6:
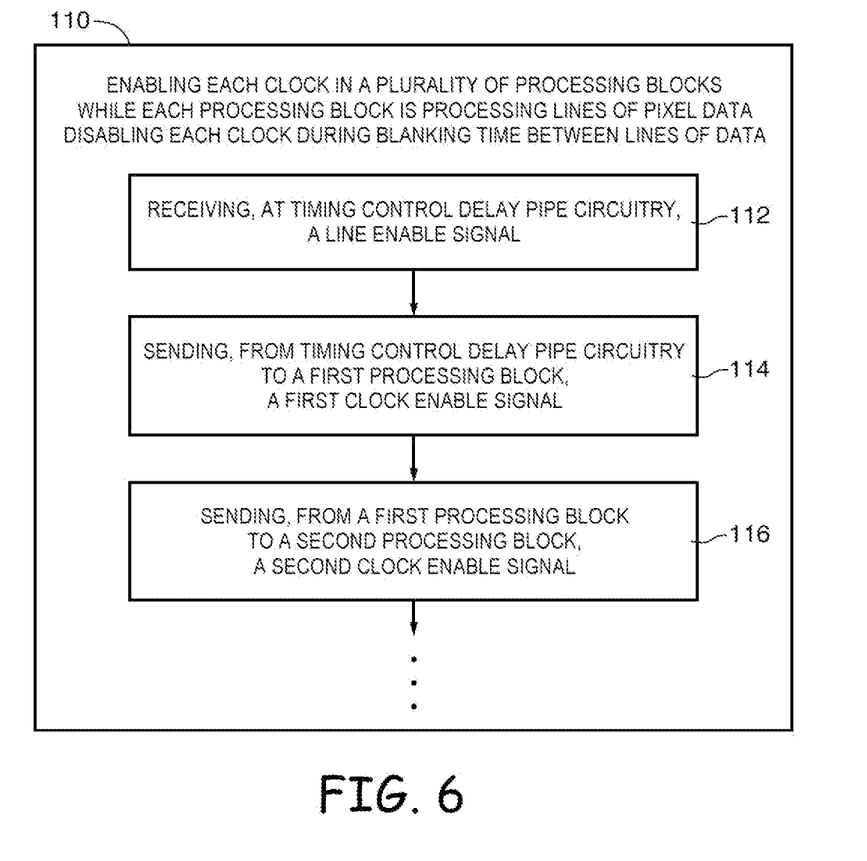
FIG. 6 is a flow chart of illustrative steps for the power saving techniques of FIGS. 1-5 in accordance with an embodiment of the present invention.

FIG. 6 is an illustrative flow chart for the power saving techniques of FIGS. 1-5. In step 110 of FIG. 6, each clock in a plurality of processing blocks is enabled while each processing block is processing lines of data. Each clock is disabled during blanking time between lines of data.

In step 112, timing control delay pipe circuitry such as circuitry 38 of FIGS. 2 and 3 may receive a line enable signal such as signal Line_enable of FIG. 5.

In step 114, timing control delay pipe circuitry 38 may send a clock enable signal such as Clock_enable1 of FIG. 5 to a first processing block such as processing block 26-1 of FIG. 2.

In step 116, a first processing block 26-1 may send a second clock enable signal such as Clock_enable2 of FIG. 5 to a second processing block 26-2 (see, e.g., FIG. 2.) Steps 116 may be repeated for subsequent processing blocks such as for processing block 26-3 of FIG. 2 and any other subsequent processing blocks.

Figure 7:
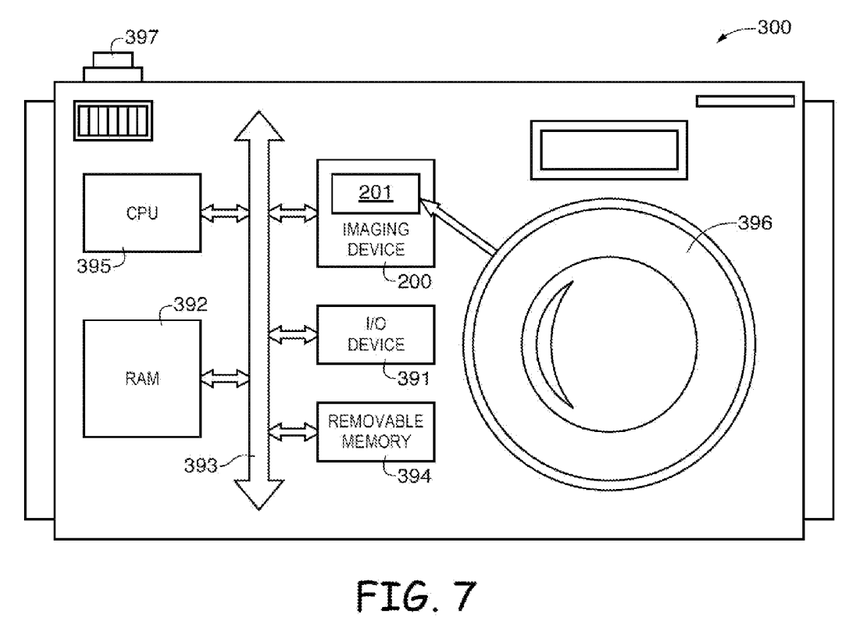
FIG. 7 is a block diagram of a processor system having the power saving techniques of FIGS. 1-6 in accordance with an embodiment of the present invention.

FIG. 7 shows in simplified form a typical processor system 300, such as a digital camera, which includes an imaging device such as imaging device 200 having the power saving techniques of FIG. 1-6. Imaging device 200 may include image sensor 10 of FIG. 1. Processor system 300 is exemplary of a system having digital circuits that could include imaging device 200. Without being limiting, such a system could include a computer system, still or video camera system, scanner, machine vision, vehicle navigation, video phone, surveillance system, auto focus system, star tracker system, motion detection system, image stabilization system, and other systems employing an imaging device.

Processor system 300, which may be a digital still or video camera system, may include a lens such as lens 396 for focusing an image onto a pixel array such as pixel array 201 when shutter release button 397 is pressed. Pixel array 201 may be pixel array 12 of FIG. 1. Processor system 300 may include a central processing unit such as central processing unit (CPU) 395. CPU 395 may be a microprocessor that controls camera functions and one or more image flow functions and communicates with one or more input/output (I/O) devices 391 over a bus such as bus 393. Imaging device 200 may also communicate with CPU 395 over bus 393. System 300 may include random access memory (RAM) 392 and removable memory 394. Removable memory 394 may include flash memory that communicates with CPU 395 over bus 393. Imaging device 200 may be combined with CPU 395, with or without memory storage, on a single integrated circuit or on a different chip. Although bus 393 is illustrated as a single bus, it may be one or more buses or bridges or other communication paths used to interconnect the system components.

Various embodiments have been described illustrating power saving techniques for processing circuitry on image sensors.

Image sensors may have processing circuitry that includes a digital core. A digital core may have one or more blocks that perform specific image processing functions. Pixel data may be processed sequentially through the blocks in the digital core.

Power saving techniques may be implemented such that clocks for individual blocks in the digital core have clocks that are enabled only when the individual blocks are processing data. When a block is not processing data (i.e. during blanking time for pixel data arriving at that block), a clock for that block may be disabled. Since data that received and processed sequentially through the blocks, clocks may be enabled and disabled for each block sequentially.

A timing control block may provide a line valid signal, a frame valid signal, and a clock enable signal to a first processing block in a digital core. The clock enable signal may enable a clock in the first processing block. The clock may be enabled a few cycles before a line of pixel data arrives at the first processing block. The clock may be disabled after the first processing block has finished processing the line of data.

Each processing block may include timing control circuitry that adds a delay to a received clock enable signal before sending the clock enable signal to a subsequent processing block. The timing control circuitry may also have logic gates that produce a clock signal for that processing block using the clock enable signal and a global continuous clock.

The foregoing is merely illustrative of the principles of this invention which can be practiced in other embodiments.

What is claimed is:

1. Image processing circuitry coupled to an image sensor that generates pixel data, comprising:

a plurality of processing blocks that process lines of the pixel data, wherein each of the plurality of processing blocks has a respective clock that is disabled between each line of the pixel data to reduce power consumption, wherein the plurality of processing block comprises:
 a first processing block that receives a first input clock enable signal and generates a first output clock enable signal that is different from the first input clock enable signal; and
 a second processing block that is different from the first processing block and that receives the first output clock enable signal and generates a second output clock enable signal that is different from the first output clock enable signal, wherein an output of the first processing block is directly connected to an input of the second processing block.

2. The image processing circuitry defined in claim 1, wherein a first of the plurality of processing blocks is configured to output a second clock enable signal for a second of the plurality of the processing blocks.

3. The image processing circuitry defined in claim 2, wherein the first of the plurality of processing blocks includes timing control circuitry having a plurality of delay elements, an OR logic gate, and an AND logic gate.

4. The image processing circuitry defined in claim 3, wherein the OR logic gate has a first input connected to the plurality of delay elements and a second input configured to receive the first clock enable signal, wherein the AND logic gate has a first input connected to an output of the OR logic gate and a second input configured to receive a global continuous clock signal, and wherein the AND logic gate is configured to output a first clock signal for the first processing block.

5. The image processing circuitry defined in claim 4, wherein the second clock enable signal is provided at an output of the plurality of delay elements.

6. The image processing circuitry defined in claim 4, wherein the plurality of delay elements are clocked by the first clock signal.

7. The image processing circuitry defined in claim 1, further comprising timing control delay pipe circuitry that includes a plurality of delay elements, wherein the timing control delay pipe circuitry is configured to receive a line valid signal and to output a first clock enable signal to a first of the plurality of processing blocks.

8. The image processing circuitry defined in claim 7, wherein the timing control circuitry further includes an OR logic gate having a first input connected to the plurality of delay elements and a second input configured to receive the line enable signal, wherein the OR logic gate is configured to output the first clock enable signal.

9. The image processing circuitry defined in claim 1, wherein the first processing block generates the first output clock signal by delaying the first input clock signal, and wherein the second processing block generates the second output clock signal by delaying the first output clock signal.

10. A method for reducing power consumption in image processing circuitry coupled to an image sensor that generates pixel data, wherein the image processing circuitry comprises a plurality of sequentially ordered processing blocks, the method comprising:
 receiving, at a given processing block of the plurality of processing blocks, a clock enable signal;
 with a delay circuit in the given processing block, delaying the clock enable signal at the given processing block to produce a delayed clock enable signal;
 sending the delayed clock enable signal directly from the given processing block to an input of a subsequent processing block;
 enabling each clock in the plurality of processing blocks while the processing blocks are processing lines of the pixel data; and
 disabling each clock during at least a portion of a blanking time between each line of the pixel data.

11. The method defined in claim 10, wherein enabling each clock in the plurality of processing blocks while the processing blocks are processing lines of the pixel data comprises enabling each clock 1 to 3 cycles before each line of the pixel data is received at the processing block.

12. The method defined in claim 10, further comprising:
 receiving, at timing control delay pipe circuitry, a line enable signal; and
 sending, from the timing control delay pipe circuitry to the given processing block, the clock enable signal.

13. A system, comprising:
 a central processing unit;
 memory;
 input-output circuitry; and
 an imaging device, wherein the imaging device comprises:
  a pixel array in a substrate; and
  an image processor that includes a plurality of processing blocks that receive pixel data from the pixel array, wherein each processing block in the plurality of processing blocks has a different clock that is individually enabled while processing a line of the pixel data and individually disabled between lines of data, wherein the plurality of processing blocks comprise:
 a first processing block that includes a plurality of delay elements, wherein the plurality of delay elements is configured to receive a first clock enable signal, delay the first clock enable signal to produce a second clock enable signal, and to output the second clock enable signal;
 a second processing block that receives the second clock enable signal directly from an output of the first processing block, and that delays the second clock enable signal to produce a third clock enable signal; and
 a third processing block that receives the third clock enable signal directly from an output of the second processing block.

14. The system defined in claim 13, wherein the image processor includes timing control delay pipe circuitry that includes a plurality of delay elements and a logic gate, wherein the timing control delay pipe circuitry is configured to receive a line valid signal, and wherein the timing control delay pipe circuitry is configured to output the first clock enable signal to the first processing block.

15. The system defined in claim 13, wherein the first processing block further includes a first logic gate that is configured to receive the first clock enable signal and the second clock enable signal.

16. The system defined in claim 15, wherein the first processing block further includes a second logic gate that has a first input connected to an output of the first logic gate and a second input configured to receive a continuous clock and wherein the second logic gate is configured to output a first clock for the first processing block.

17. The system defined in claim 13, wherein the plurality of processing blocks include a defect correction processing block and a scaling processing block.

18. The system defined in claim 13, wherein a first processing block in the plurality of processing block includes a plurality of delay elements, wherein the plurality of delay elements is configured to receive a first clock enable signal, and wherein the plurality of delay elements is configured to output a second clock enable signal to a second processing block in the plurality of processing blocks.

* * * * *